US012381745B2

(12) United States Patent
Donlan et al.

(10) Patent No.: US 12,381,745 B2
(45) Date of Patent: Aug. 5, 2025

(54) IDENTITY AUTHORITY

(71) Applicant: Amazon Technologies, Inc., Seattle, WA (US)

(72) Inventors: Bryan James Donlan, Seattle, WA (US); Petr Praus, Seattle, WA (US); Douglas Stewart Laurence, Mercer Island, WA (US); Andrew C Schleit, Seattle, WA (US); Daniel Leon Gregory Gardner, Blessington (IE); Zaher Dannawi, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 677 days.

(21) Appl. No.: 17/362,899

(22) Filed: Jun. 29, 2021

(65) Prior Publication Data

US 2022/0417036 A1 Dec. 29, 2022

(51) Int. Cl.
*H04L 29/06* (2006.01)
*H04L 9/32* (2006.01)
*H04L 9/40* (2022.01)

(52) U.S. Cl.
CPC ........ *H04L 9/3268* (2013.01); *H04L 63/0823* (2013.01)

(58) Field of Classification Search
CPC .... H04L 9/3268; H04L 63/0823; G06F 21/33
See application file for complete search history.

(56) References Cited

U.S. PATENT DOCUMENTS

| | | | | |
|---|---|---|---|---|
| 7,707,406 B2* | 4/2010 | Qiu | ...................... | H04L 9/0891 |
| | | | | 713/157 |
| 10,263,789 B1* | 4/2019 | Popoveniuc | .......... | H04L 9/3268 |
| 10,771,261 B1* | 9/2020 | Lazar | .................... | H04L 9/3268 |
| 11,100,232 B1* | 8/2021 | Juncker | ................. | H04L 63/102 |
| 11,388,594 B2* | 7/2022 | Uy | ........................ | H04L 9/0844 |
| 2004/0148505 A1* | 7/2004 | Qiu | ......................... | G06F 21/33 |
| | | | | 713/175 |

(Continued)

OTHER PUBLICATIONS

Ravi Sandhu et al., Peer-to-Peer Access Control Architecture Using Trusted Computing Technology, Jun. 1, 2005, ACM, pp. 147-158. (Year: 2005).*

(Continued)

*Primary Examiner* — Randy A Scott
*Assistant Examiner* — Fahimeh Mohammadi
(74) *Attorney, Agent, or Firm* — Davis Wright Tremaine LLP

(57) ABSTRACT

Systems and methods are described for rotating keys in a trust store to be used by a group of peer devices for secure communications between the peers in the group. In some examples, a service, such as an identify authority service, may make a determination that a set of peers that individually trust at least one public key from a group of public keys satisfies a set of conditions. As a result of the determination, the service may update the plurality of public keys by at least removing at least one public key from the group of public keys and indicate the updated plurality of public keys to at least one of the peers in the group. The service may remove the at least one public key from the group upon determining that less than a threshold number of peers in the group use the at least one public key.

17 Claims, 7 Drawing Sheets

(56) References Cited

U.S. PATENT DOCUMENTS

| | | | |
|---|---|---|---|
| 2007/0116269 A1* | 5/2007 | Nochta | H04L 9/3236 |
| | | | 380/30 |
| 2007/0294526 A1* | 12/2007 | Medvinsky | H04N 21/235 |
| | | | 713/158 |
| 2010/0169963 A1* | 7/2010 | Kleinpeter | H04L 63/062 |
| | | | 713/182 |
| 2016/0065377 A1* | 3/2016 | Ichijo | H04W 12/12 |
| | | | 713/175 |
| 2020/0029209 A1* | 1/2020 | Nölscher | H04W 12/069 |
| 2020/0059372 A1* | 2/2020 | Goeringer | H04L 9/007 |
| 2020/0153627 A1* | 5/2020 | Wentz | H04L 9/50 |
| 2020/0178080 A1 | 6/2020 | Yasaki et al. | |
| 2021/0044579 A1* | 2/2021 | Nelson-Gal | H04L 63/062 |
| 2021/0111875 A1* | 4/2021 | Le Saint | H04L 9/3263 |
| 2021/0211307 A1* | 7/2021 | Statia | H04L 67/51 |
| 2021/0359911 A1* | 11/2021 | Saraswat | H04L 63/20 |
| 2022/0256337 A1* | 8/2022 | Ohlsson | H04W 12/63 |

OTHER PUBLICATIONS

Minaxi Gupta et al., A Reputation System for Peer-to-Peer Networks, Jun. 1, 2003, ACM, pp. 144-152. (Year: 2003).*

Nitesh Saxena et al., Admission Control in Peer-to-Peer: Design and Performance Evaluation, Oct. 31, 2003, ACM, pp. 104-113. (Year: 2003).*

Shane Balfe et al., Trusted Computing: Providing Security for Peer-to-Peer Networks, Dec. 12, 2005, IEEE, pp. 1-8. (Year: 2005).*

International Search Report and Written Opinion mailed Sep. 23, 2022, Patent Application No. PCT/US2022/033074, 17 pages.

* cited by examiner

IDENTITY AUTHORITY

BACKGROUND

Establishing trust, and trusted communication channels, between computing devices, such as cloud computing services, is a constantly evolving problem. With more and more computing services being consumed and being offered over various networks, it is increasingly important to be able to efficiently establish secure communication channels to communicate data between different end points. Various public key infrastructure (PKI) systems have been developed to address this issue. These system typically establish truth via certificates that bind public keys with entity identities that are issued by a certificate authority (CA). These infrastructures have historically used certificates that naturally expire after a short duration, to protect against unwanted access, thus requiring new certificates to be issued regularly. This process of regular issuing certificates has the downside, in various applications, of breaking secure and trusted communication channels when no compromising event has been detected. In cases where a trusted group of entities only communicates with other members of the trusted group, this can add additional and unnecessary overhead in necessitating new certificates to be regularly issued, while not enhancing security between the group.

BRIEF DESCRIPTION OF THE DRAWINGS

Various techniques will be described with reference to the drawings, in which.

DETAILED DESCRIPTION

Figure 1:
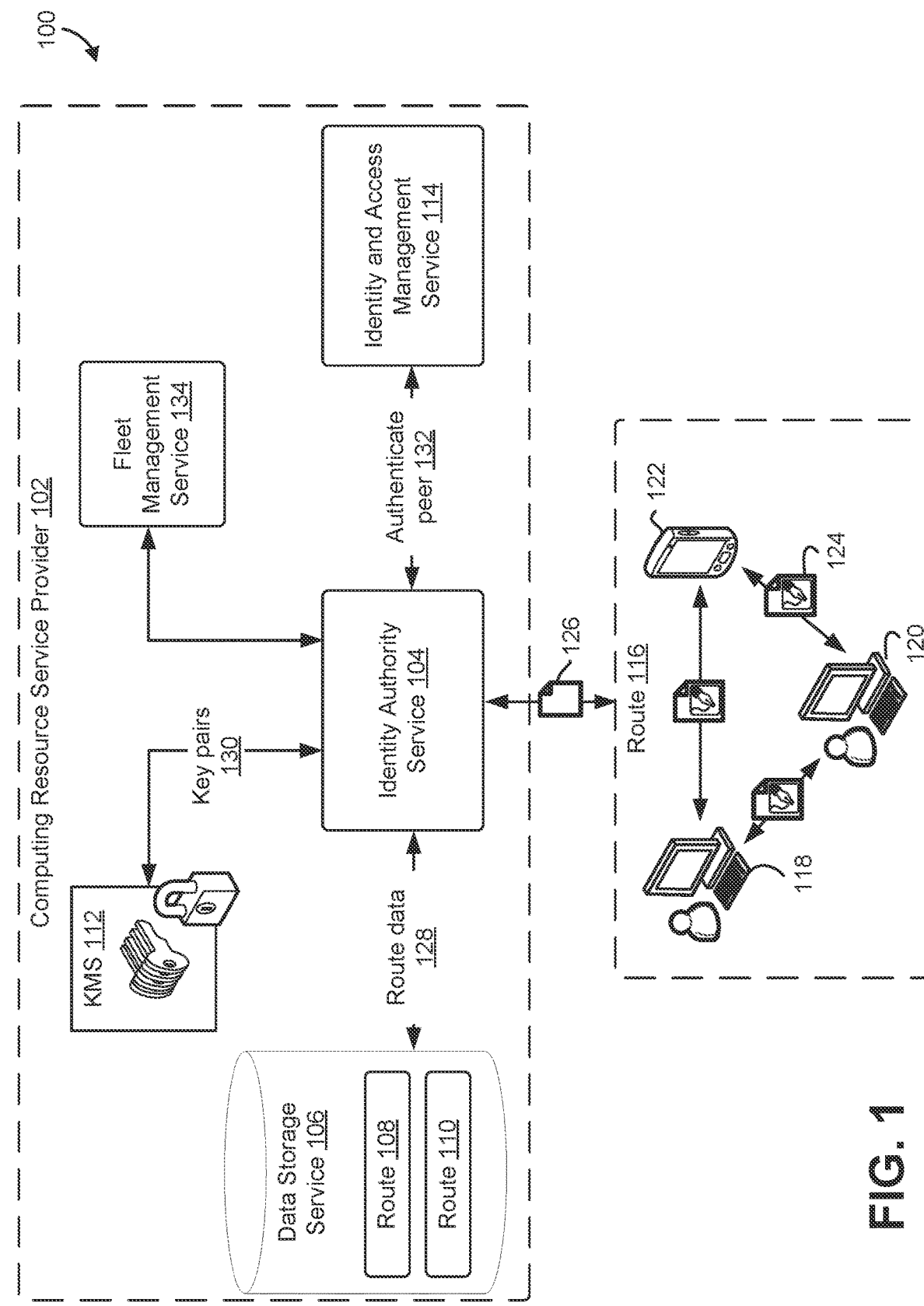
FIG. 1 illustrates an example environment in which the described techniques can be practiced, according to at least one embodiment.

Systems and methods are described herein relating to employing rotating cryptographic keys to establish secure communication channels between peers. A service, such as an identity authority (IA) service, can be deployed to issue and maintain a set of cryptographic keys for use between peer devices. Peer devices are assigned to different routes, or groups of peer devices that can communicate with one another securely. The set of cryptographic keys are part of a trust store, which is maintained by the IA service and the individual peer devices. Cryptographic keys in the trust store, referred to as route key pairs, are assigned a different status or state, such as pending, issuing, and deprecated. Key or keys that are set to issuing can be used to issue certificates for encrypting communications between peers. Peers can then use the issued certificates to establish secure communication channels, such as mutually-authenticated transport layer security (TLS) 1.3 sessions, without additional network calls and the associated latency. Keys set to pending are keys that have been recently added to the trust store, but are not trusted by some or most peers yet. Deprecated keys are keys that are trusted by peer devices, but are no longer used for issuing certificates. Keys in the trust store may be rotated between the different statuses or states, such as periodically. An example rotation may include a key pair starting as pending, moving to an issuing state, and then being moved to deprecated. Keys do not have a time-based expiration such that they may not naturally, or by default, expire. Rather, route key pairs may only be deactivated when the key pairs are verified as no longer being in use by the group of peers. The IA service tracks which keys are being used by different peers in the group to control rotation of the keys to different states.

In some aspects, the IA service is a system that operates as public key infrastructure (PKI) and a credential distribution system. The IA service implements an operationally safer PKI model where certificates stop being trusted when one or more external systems verify the certificates are no longer in use (certificate retirement) rather than based on a time value for expiration (e.g., a certain date and time). The IA service monitors which certificates are used in production systems (e.g., on publicly facing servers) and does not remove certificates that are still in use. In contrast to the traditional PKI model where absence of action (failure to renew a certificate) results in a broken system, absence of action detected by the IA service may results in a change to the rotation of keys rather than breakage or failure of the keys to be operable.

Unlike traditional PKI systems, the described techniques do not need to maintain any long-lived expiring root keys that every peer trusts. Instead, for every route, the IA service maintains a list of route key pairs it uses to issue peer certificates. Each route key pair (RKP) has an associated self-signed route certificate that carries the public route key. Every peer on a route can periodically poll for the current list of route certificates, such as maintained in a trust store. In some cases, route key pairs and certificates do not expire based on time, but instead, are removed by the IA service when an external component requests that the keys be removed. The IA service tracks every peer so that it can sanity-check actions requested by any external components or systems. The IA service generally will not remove the RKP that issued a peer certificate until the peer has verified that the peer has moved onto a newer peer certificate, or the IA service is instructed (by the peer itself or an external component) that the peer should be ignored. Similarly, the IA service tracks what RKPs are trusted by peers and allows activating an RKP when it is determined that the new RPK is in trust stores of all active (non-ignored) peers.

In some cases, peer devices can use existing credentials established with a provider that hosts or interacts with the IA service to then request a peer certificate from the IA service. In some examples, the request for a peer certificate contains the peer's public key and may be authenticated using underlying credentials issued by the provider. The IA service then authenticates the request and signs the peer's public key thus issuing a peer certificate. The peer now has a complete identity. The certificate represents an approval from the IA service for the peer to operate on a given route.

Similar to peer devices, routes have a cryptographic identity as well. For each route, the IA service maintains a list of route key pairs that are used to sign peer's public keys and issue peer certificates. Each route key pair also has an associated self-signed CA certificate, referred to as a route certificate, which is a convenient way to distribute the public portion of the key pair in a way that can be easily consumed by any TLS implementation. Every peer on a route can periodically ask the IA service for the list of all route certificates it should trust at the moment the call is made. In some cases, the IA service delegates authentication and authorization of clients to an external system that forms the root of trust for the IA service and peers. In some aspects, trust is temporarily delegated to the authority from the external system.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: 1) establishing low-latency secure channels between peer devices, 2) reducing network communications and bandwidth usage to establish secure communication channels between peer devices, and 3) other benefits and advantages as will be described and made apparent throughout the remainder of this disclosure.

FIG. 1 illustrates an example environment 100 in which an identity authority (IA) service 104 may be provided by a computing resource service provider 102. Various peer devices 118, 120, 122 may communicate with each other and with the computing resource service provider 102 over one or more networks. The computing resource service provider 102 may provide any number of services that may be made accessible to the peer devices 118, 120, 122, such as an identity authority service 104, a data storage service 106, a key management system or service (KMS) 112, a fleet management service 134, and an identity and access management service 114, as will be descried in greater detail below.

A peer device 118, 120, 122 may refer to any computing device, such as a host or server, that communicate over a network. Peer device 118, 120, 122 may be a group of servers that provide any of a number of services, such as may be provided by the computing resource service provider 102. In other examples, a peer device 118, 120, 122 may refer to a client computer system or computing device connected to a server (e.g., of computing resource service provider 102) over a network. A peer device 118, 120, 122 may be a physical computing device or a virtual computing device. A group of peer devices 118, 120, 122 that communicate with each other is referred to herein as a route 116. Optionally, client and server roles may be defined on a route 116 and can either be statically assigned (e.g., one fleet talking to another) or change dynamically (e.g., hosts elect a leader which acts as a server and everyone else is a client). Route 116 may include any number of hosts or servers, any number of client devices, or a combination thereof. It should be appreciated that the identify authority (IA) service 104 may define any number of different routes 116, each including different or overlapping peer devices 118, 120, 122.

Each peer 118, 120, 122 in a route 116 may communicate with other peer devices by establishing a secure communication channel using a certificate that is issued and managed by the IA service 104. As illustrated, peer 118 may communicate with peer 122 using a certificate 124 to establish a secure communication link implementing a version of TLS, such as TLS 1.3. Similarly, peer 118 may communication with peer 120 via a secure channel using certificate 124, and peers 120 and 122 may communicate via a channel made secure by certificate 124. The IA service 104 may issue route certificates, such as certificate 126 to a group of peers 118, 120, 122 to enable the peers to communicate securely with one another, as will be described in greater detail below. In some cases, certificate 126 may include or be based on a key pair, referred to herein as a route key pair (RKP), that can be used by peer devices 118, 120, 122 in route 116 to issue certificate 124 to securely communicate with other peers 118, 120, 122 of route 116. Example communications between peers 118, 120, 122 and IA service 104 will be described in greater detail below in reference to FIG. 2.

In some aspects, each peer device 118, 120, 122 may have at least two kinds of identities: an identity that is established with the IAM service 134 and an identity established with the IA service 104. For service host devices (e.g., infrastructure devices or servers that may be internal to or part of the computing resource service provider 102), providing the IAM identity may be performed by a credential distribution system provided by the computing resource service provider 102. For client devices, the IAM identity can be provided by a similar or different credential system. Each peer 118, 120, 122 may thus have a set of credentials that allow it to interact with the computing resource service provider 102 through the IAM service 134. In some implementations, the IA service 104 may utilize IAM service 134 and the corresponding IAM credentials to abstract itself from the implementation details of identities in different network fabrics. In some aspects, the IA service 104 may utilize the same or similar authentication and authorization mechanisms as other services provided by the computing resource service provider 102.

In some examples, a peer device's IA service 104 identity uniquely identifies each peer on a route and acts as the foundation of trust. Peer identity may include a peer key pair generated by the peer and a peer certificate. The certificate binds the peer's IAM identity to the peer key pair and represents permission from the IA service 104 for the peer to join a route. Together, the key pair and the certificate constitute the peer's identity. Peers use their key pair to prove control of the identity to other peers during transport encryption protocol handshake (e.g., CertificateVerify in TLS 1.3).

The computing resource service provider 102 may provide various services such as data processing, data storage, software applications, security, encryption, and/or other such services. A computing resource service provider described herein may be implemented using techniques described below in reference to FIG. 7. The computing resource service provider 102 may provide services that may be accessible through various software, hardware, and/or variations thereof. In some examples, the services may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other various capable computing systems.

In some examples, the computing resource service provider 102 may provide an Identity authority (IA) service 104. The IA service 104 may be a collection of computing resources configured to access and analyze data, such as from one or more data storage services 106, determine security roles and management access by one or more peer devices through identity and access management (IAM) service 114, request, obtain, and management cryptographic keys from a key management system (KMS) 112, coordinate with a fleet management service 134 to manage a number of devices, such as peer devices 118, 120, 122, and services, and communicate with peer devices 118, 120, 122 in various routes 116 to enable the peers 118, 120, 122 to securely communicate with one another, as will be described in greater detail below.

In some examples, the computing resource service provider 102 may provide data storage through a data storage service 106 to store and manage large volumes of data, including image and other media data. The data storage service 106 may store various information for different routes, referred to herein as a trust store, such as trust store 108 and 110. In some cases, the data storage service 106 may interact with IA service 104 to store and provide access to different information stored in trust stores 108, 110 for different routes. In some cases, route information 108, 110 may include a number of certificates or RKPs that may be used by the corresponding route, such as route 116. The collection of different certificates/RKPs stored for a given route may be referred to as a trust store, where each certificate/RKP may be referred to as a trust anchor. Each RKP has an associated self-signed route certificate that carries the public route key.

Data storage service 106 may be an on-demand data storage service, such as an object-based data storage service that services API requests to store and retrieve data objects synchronously, and may be configured to store various forms of media. The data storage service 106 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein. In some examples, data stored in the data storage service 106, may be organized into data objects, in one or more logical data containers. The data storage service 106 and/or the trust stores 108, 110 may include one or more data objects, which may have arbitrary sizes and may, in some instances, have constraints on size. Thus, the data storage service 106 may store numerous data objects of varying sizes. The data storage service 106 may operate as a key value store that associates data objects with identifiers of the data objects which may be used by the IA service 104 and/or peer devices 118, 120, 122 to retrieve or perform other operations in connection with the data objects stored by the data storage service 106. Access to the object-based data storage service 106 may be through application programming interface (API) calls to the service or via an interface, such as a graphical user interface (GUI). Access to the data storage service 106 may be through application programming interface (API) calls to the service, for example from the IA service 104 and peers 118, 120, 122, directly or through the computing resource service provider 102. It should be appreciated that the data storage service 106 may additionally or alternatively provide non-object based data storage, such as block data storage, table-oriented data storage, relational databases, file-based storage, and the like. The data storage service 106 may also implement an archival system or process that stores certain data objects in different storage locations, devices, etc., for example, based on access to those data objects or other factors. For example, some data objects that have not been accessed for a certain period of time may be moved from a storage device or location (e.g., referred to herein generally as storage class) that provides prompt access, albeit at increased cost, to a more cost effective storage class that may provide access with some delay, different redundancy, or other attributes.

The computing resource service provider 102 may also provide a key management system (KMS) 112. KMS 112 may be a collection of computing resources configured to generate, exchange, store, use, destroy, replace, and provide cryptographic keys for use by peer devices and other services, as is known in the art. The IA service 104 may obtain one or more cryptographic keys from the KMS 112 via request 130, for use in establishing and updating various trust stores 108, 110 for different routes. In some cases, the IA service 104 may obtain new RKPs from the KMS 112 at regular or periodic intervals for regularly updating, e.g., adding, RKPs to the different trust stores 108, 110. In some cases, the IA service 104 may update or add one or more cryptographic key pairs to a trust store 108, 110 every day, every 12 hours, every few days, every week, etc. The period for updating or adding keys to the trust stores 108, 110 may be determined or selected based on peer communication frequency usage, level of security needed for peer communications, sensitivity of data communicated by the peer devices, and so on.

In some aspects, KMS 112 may maintain and store various cryptographic keys that are used by the IA service 104 and by peers 118, 120, 122. In some aspects, IA service 104 will use KMS client master keys (CMKs) for route key pairs. In addition, support for customer-managed CMKs can be easily added in other implementations. In some cases, a KMS CMK may be used. In some aspects, the IA service may or may not use KMS asymmetric CMKs for route key pairs. The benefit of not using KMS asymmetric CMKs is that the private route key never has to leave KMS 112, thus increasing security. On the other hand, using KMS asymmetric CMKs creates a direct data plane dependency on KMS 112, which may be undesirable for users of the IA service 104. While the route keys would not leave KMS 112, IA service 104 would still be fully in control what certificates get issued. An attacker who has compromised IA service 104 would not be able to access the route keys but they could issue themselves any peer certificates they need.

The computing resource service provider 102 may also provide an identity and access management (IAM) service 114. The IAM service 114 may be a collection of computing resources, including physical resources, virtual resources, or combinations thereof, configured to control access to resources provided by the computing resource service provider 102. In some implementations, the IA service 104 may utilize existing access systems provided and managed by the IAM service 114 to control access to certificates managed by the IA service 104. In some cases, each peer 118, 120, 122 may authenticate using credentials or an identity established with the computing resource service provider 102 by authentication performed through the IAM service 114, via techniques known in the art. In other cases, peers 118, 120, 122 may establish a separate identity with the IA service 104, for purposes of joining a route 116 and establishing secure communications with other peers in that route 116.

The computing resource service provider 102 may also provide a fleet management service 134. The fleet management service 134 may be a collection of computing resources configured to manage fleets of computing devices, such as physical and virtual servers. The fleet management service may provide one or more user interfaces to enable customers to view operational data from various services provided by the computing resource service provider 102. In some implementations, fleet management service 134 may manage peer device access and RKP rotation for various routes. In some aspects, RKP's may be deleted via requests or instructions received from the fleet management service 134. In some cases, other entities, such as trusted or authorized entities may request that an RKP be removed from a trust store for a given route. By, in some cases, restricting the authority to delete or remove RKPs from a trust store, access to certificates within a route, and the ability for peers to communicate with other peers in the route may be maintained.

In some aspects, the IA service 104 may store and access information about different routes, 108, 110 through communications 128 with a data storage service 106. The IA service 104 may at various times, rotate or change which certificates or RKPs are stored for a given route, assigning various states or statuses to the different RKPs. The IA service 104 may access the KMS 112 to obtain secure cryptographic keys for generating and updating trust stores for different routes, issuing and signing certificates for peer devices, and so on. The IA service 104 may verify access for different peer devices 118, 120, 122 to join specific routes and to ensure the peers are trusted, via authenticating the peer devise with the IAM service 114. In some cases, the IA service 104 may remove RKPs from a trust store for a route upon receiving an instruction from the fleet management service 134 or other authorized entity. In some cases, the IA service itself may be restricted from removing RKPs from a trust store.

In some aspects, the IA service 104 may function on top of KMS 112 to provide certificates for peer devices 118, 120, 122. The IA service 104 may verify with the IAM service 114 or other authentication service, if a request from a peer to obtain a peer certificate is allowed. In some cases, this may take the form of verifying that the identity of the peer 118, 120, 122 is associated with credentials of or known by the IAM service 114 that are allowed on a given route 116. If the peer is verified such that the request is allowed, the IA service 104 can then communicate with the KMS 112 to obtain a key pair to sign incoming public keys from peer devices of the route 116. The IA service may then sign the incoming public key (e.g., by signing a certificate comprising the public key using a private key of the currently issuing RKP) and generate a certificate, such as a X.509v3 certificate, and provide the certificate to the requesting peer device 118, 120, 122. The IA service 104 may also make available the public signing key so that peer devices 118, 120, 122 can verify signatures in the future without having to request the public signing key from the IA service 104.

In some aspects, each route 116 may be fully identified by its route identifier, resource name (RN), or other such identifier which includes route name. Route names are unique within a given account but may not be across accounts. In some aspects, route names may include partition, region, and cell in the name. The route name may be selected to positively identify the route, over a randomly generated name, to make usage of routes more intuitive for users. In some cases, the route identifier may be used in all communications, including API calls, with the IA service 104. An example of a route RN is as follows: RN: identityauthority:us-west-2:111122223333:route/FooBar-aws-us-west-1-cell-123, where "FooBar . . . " is the route RN and "42" is the RKP SN. Every route key pair (RKP) on a route is identified by its monotonically increasing integer serial number (RKP SN). In some implementations, the RKP SN may start at $2^{32}+1$ to ensure it cannot be stored in a 32-bit integer type and therefore spares crossing the integer overflow boundary in the future. The serial number provides total ordering of RKPs pertaining to a given route. A route key pair is fully identified by its RKP RN which includes both route name and SN. A route key pair may belong to exactly one route so as to not confuse route identification.

In some aspects, the IA service 104 may store various information pertaining to peer devices in routes in one or more tables or other data structures, such as in coordination with the data storage service 106. In some cases, no or minimal secret information may be stored by the data storage service 106 in unencrypted form. Integrity is ensured with various mechanisms appropriate for the data in the table, via techniques known to those of skill in the art.

A route key pairs table may capture route key pairs and their ciphertext blobs. Items in the table provide a 1:N mapping between a route and its key pairs, where N is a positive integer. The route key pairs table, in some implementations, stores a partition ("primary") key, which may be a route identifier or RN, and a sort key, which may be the RKP serial number. This schema allows for queries to find adjacent RKPs belonging to the same route and also ensures that there are no duplicate serial numbers. The Item attributes may include route RN, RKP SN, RKP status (pending, issuing, deprecated, deactivated), ciphertext blob, signing algorithm, creation timestamp, last reported use timestamp, and certificate. Items in the RKP table are not secret and integrity is ensured by including the entire item as part of the encryption context for the RKP data key. If an attacker was to change one of the fields in the table, it would invalidate the KMS ciphertext blob itself. In some cases, exactly one RKP is set to the issuing RKP for a route at any given time. In this case, status for different RKP's in a route table will be changed simultaneously.

A route table may capture routes themselves. Every item in the table corresponds to one route. A route table will typically include a partition key, which is the route identifier or RN. Item attributes may include route RN, KMS CMK RN, route creation timestamp, route certificates checksum, certificate signing algorithm, and route change signature (see below). Items in the routes table do not need to be kept secret, but integrity needs to be ensured. In one example, an asymmetric KMS client master key (CMK) may be used that signs a hash of the item ("route change signature"). The advantage of asymmetric CMK is that the signing key never leaves KMS 112, which ensures every valid route change ends up in 1 log of the KMS CMK.

A peer table may capture information about peers. A peer starts its life in this table when it gets its first certificate and ends it when it is ignored. The fields pertaining to the route and peer certificates peers may be updated via reporting by the peers. Items in this table are cleaned up when the highest SN in trust store points to an RKP that has already been deleted (not just deactivated). In the peer table, a partition key is peer nickname and sort key is lineage ID. Global secondary index may be stored by [lineage ID] enables finding specific peers by their lineage ID. Global secondary index may be stored by [route RN, highest SN in trust store]. This is useful for efficiently finding peers that have reported having old trust stores on their routes. Item attributes may include lineage ID, peer nickname, group name, route RN, peer status (active or ignored), highest RKP SN in peer's trust store, oldest active peer certificate SN.

A peer certificates table may captures all peer certificates issued by RKPs that haven't been deleted yet. The partition key for a peer certificate table may be the subject key identifier, such as a SHA-256 hash of the peer public key. This may ensure that peers do not reuse their public keys and are forced to rotate them. Conveniently, it also distributes certificates across data storage service shards so when a high number of peer certificates are issued for a route, writes get evenly distributed across shards. Global secondary index may be stored by [route RN, certificate serial number] to find specific peer certificates. Global secondary index stored by [route RN, [RKP SN, certificate status]] allows finding certificates that were issued by a particular RKP with a particular status, such as listing all active certificates for an RKP we are considering removing. Item attributes may include: route RN, RKP SN that issued the certificate, peer certificate SN, certificate, status (active or deprecated), lineage ID, issuance timestamp, last status change timestamp, and shard ID (see "Appendix: Peer Certificate Queue").

As described herein, routes may employ two signing algorithms: a route signing algorithm is used to sign peer certificates with private route key and a peer signing algorithm is used by peers during handshakes to sign certificate challenges (CertificateVerify) with their peer private keys. Both signing cases may utilize ECDSA on NIST P-256 curve with SHA-256 message digest, or other signing algorithms such as those known in the art.

In some aspects, it may be important that a certificate stops being trusted only once one or more mechanisms actively verify the certificate is truly no longer used. Lack of action (e.g., failure to renew a certificate) may trigger an alarm but not result in a breakage, or the certificate not being trusted. Typical PKI systems violate this condition because they use certificates with time-based expiration. When the mechanism that is supposed to renew expiring certificates fails unnoticed for sufficiently long, peers in the system stop trusting each other. The described systems and methods take a different, operationally safer approach while maintaining high security bar.

In some implementations, the IA service 104 may refrain from taking action on RKPs on its own initiative. An external component may signal IA service 104 to create, activate, deprecate, remove, and delete RKPs. The external component driving the rotation schedule may be as simple as a function triggered by events that are monitored by the IA service 104, by the fleet management system 134, or by the computing resource service provider 102. When a new route key pair is created, IA service 104 will immediately start returning the route certificate of the new RKP as part of the route trust store along with all the other valid route certificates from the trust store Peers that have communicated with IA service 104 after the new RKP and its certificate were added will now trust the new route certificate as well as all the previous route certificates that are still in its trust store. In some aspects, when first created on a route, an RKP is considered pending. Certificates issued under the newly-added key pair typically are not trusted by most peers in the route yet, such as due to communication lag. In large fleets or peer devices, it may take at least a couple hours for all hosts or peers to talk to IA service 104 and add the route certificate of the new RKP to their route trust stores. Therefore, when IA service 104 issues a peer certificate, it does so with the issuing route key pair. An RKP becomes issuing after it has been in circulation for a while and an external component, such as fleet management service 134, calls IA service 104 to promote the oldest pending RKP to issuing (such as via the AdvanceIssuingRouteKeyPair API call described above).

For additional safety, in some implementations, the IA 104 may restrict peers from changing the issuing RKP when there is a peer on the route that has obtained a peer certificate but either hasn't reported how its trust store looks like or it has and it does not have the route certificate of the oldest pending RKP that would become the issuing RKP for the route. Such a peer would be cut off from peers who tried to authenticate with peer certificates issued by the new RKP. To unblock the rotation, the peer itself the fleet management system 134 may instruct the IA service 104 to forget the peer.

In some implementations, the IA service 104 may be provided in such a way as to operate on top of or in conjunction with an existing fleet management service 134 or other similar service or system. In some cases, IA service 104 drives key rotation and automatically ignores a configurable percentage of peers within a 24-hour period to account for fleet attrition. Tools may also be provided for manual peer management. In some aspects, the IA service 104 may manage certificate and peer lifecycle, but be abstracted from individual peers or hosts and tracking them. The IA service 104 may see IAM entities that want certificates and their self-selected identifiers.

In yet some examples, symmetric cryptographic techniques may be utilized in addition to or in place of the asymmetric cryptographic methods described above. In these cases, a shared secret may be implemented between peers 118, 120, 122 and IA service 104. In some cases, hash-based message authentication code or keyed-hash message authentication code (HMAC) techniques may be utilized to share facilitate sharing secrets between different entities. In other cases, one or more other symmetric cryptographic techniques may be utilized to a similar effect.

Figure 2:
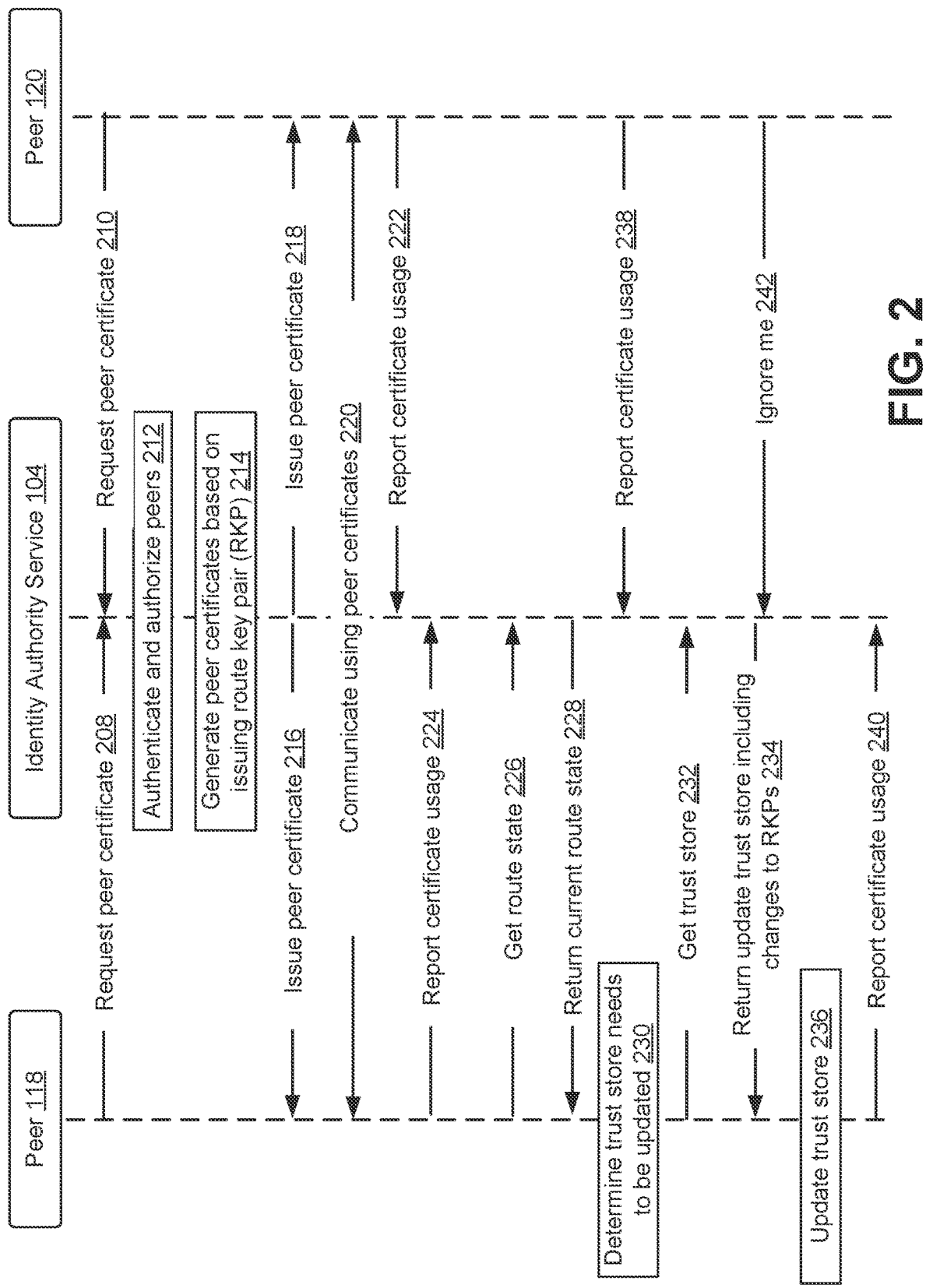
FIG. 2 illustrates example communications between peer devices and an identity authority service to establish a secure communication channel between the peer devices, according to at least one embodiment.

FIG. 2 illustrates example communications between peer devices 118, 120 and an identity authority service 104 to establish a secure communication channel between the peer devices, according to at least one embodiment.

Before a peer 118, 120 can access a route, it obtains its peer certificate by calling an IssuePeerCertificate API, such as illustrated at operations 208 and 210 to the IA service 104. The peer 118, 120 may sign the request 208, 210 using an IAM identity, for example, that has permissions to make the request. The IA service 104 may authenticate and authorize each peer device 118, 120, at operation 212. In some cases, operation 212 may include verifying with another service, such as the IAM service 134 described above in reference to FIG. 1, that the peer 118, 120 is authorized to request a peer certificate and access the IA service 104. The IA service 104 may, upon authentication of the peers 118, 120, generate a peer certificate for each peer 118, 120 based on an RKP identified for the route, at operation 214, as described above in reference to FIG. 1. Operation 214 may include accessing the RKP from the data storage service 108, and having the KMS 112 decrypt the RKP. The IA service 104 may then issue the peer certificates to peers 118, 120 at operations 216, 218 respectively. The certificates allow peers 118, 120 to independently prove to other peers on the route that IA service 104 has allowed the holder of the associated peer private key to access this route. In some cases, peer 118, 120 call IssuePeerCertificate with a fresh public key. In some cases, the IA service 104 may not issue a peer certificate for a public key that has been used before. This may facilitate the IA service 104 and peers 118, 120 rotating key pairs. This may also prevent cases where a customer keeps using a key pair indefinitely.

Once a peer 118, 120 has a new peer certificate, it can immediately start using it. As will be described in greater detail below, each peer may maintain a list of RKPs with different statuses attached to them. An RPK that is being changed to issuing, as in the case of operations 214 and 216, has already been received and confirmed by peers 118, 120 of the route and set to pending status. Each peer 118, 120 will maintain any previous peer certificate and fall back to it if it experiences too many failed connections while using the new peer certificate. In some cases, every peer periodically reports actively used peer certificates, such as at operations 222, 224. In some examples, peers 118, 120 may report certificate usage at any of a variety of configurable periods, such as hourly, every 6 or 12 hours, every 24 hours, etc., depending on how often keys are rotated, the number of peers in the route (e.g., the larger the number, the more frequent each peer may report its certificate usage) As a result, the IA service 104 will be aware the old peer certificate is still actively used and may not allow removal of the RKP that issued it from the route trust store. In some cases, operation 222, 224 may indicate (a) which of its peer certificates it actively uses, (b) what route certificates it trusts, and (c) how many times each route certificate has been used to establish trust with remote peers since the last report.

Reporting actively used peer certificates (a) allows recovery from cases where fleet management service 134 or the peer itself incorrectly marks a certificate as deprecated but it turns out it is used. Reporting trusted route certificates (b) is important to ensure IA service 104 does not start issuing peer certificates from an RKP until it can verify every active peer trusts that RKP. Reporting observations about route certificates remote peers rely on (c) to connect to the reporter helps catch bugs where a peer reports using a newer certificate but keeps using an older one in reality. To keep the size of reports to IA service 104 small and load on the peers low, peers 118, 120 can aggregate their observations rather than reporting exactly which remote peer used what peer certificate. Peers may additionally or alternatively log this information for debugging purposes.

In cases where a peer 118, 120 cannot contact IA service 104, the peer 118, 120 can simply keep using the certificate it received the last time it was able to communicate with IA service 104. The certificate will remain trusted by the rest of the fleet until the issuing RKP is deactivated. As previously described, the removal will not be triggered until IA service 104 receives positive acknowledgement from every active peer in the route that the old RKP is not being used.

In some cases, to ensure that certificate usage and trust store of peers in a route is up to date, every peer 118, 120 on a route will refresh its route state by calling GetRouteState at operation 226, such as at least once an hour. It's a fast freshness check peers use to discover if anything on the route has changed and returns two pieces of data, such as may be included in a current route state response 228. First, GetRouteState returns the current route certificates checksum which indicates to peers if they should update their route trust store using ListRouteCertificates. Second, GetRouteState returns the issuing route certificate SN which indicates to peers if they should ask IA service 104 for a new peer certificate (that will be issued under the new route certificate).

In some aspects, a peer, such as peer 118, may determine that its trust store needs updating, at operation 230. This may be in response to the current route state 228 including a new certificate/RKP identified for the route, and/or a change in status of one RKP already in the trust store for the route. As described above, each peer 118 will maintaining information indicating which certificate/RKPs are active for the route and what their status is. In an example implementation, statuses for a certificate/RKP may include issuing, pending, deprecated, and deactivated (or removed). Details of these statuses will be described in greater detail below in reference to FIGS. 3 and 4. It should be appreciated that other statuses may be used, and in some cases, a different number of statuses may be used to achieve similar benefits.

Upon determining that its trust store needs to be updated, at operation 230, peer 118 may request the current version of the trust store for the route form the IA service at operation 232. The IA service 104, in response, may access the current route information, such as from a route table stored by a data storage service, and return the updated trust store including the changes made to the RKPs, at operation 234. In some cases, this may include information identifying all of the RKPs or certificates in the trust store, or just changes made to the existing version of the trust store the peer is 118 is in possession of. The peer may then update its trust store at operation 236. As described above, each peer may continue to periodically report their certificate usage, such as represented by operations 238 and 240. In some cases, a peer may leave a route by sending an ignore message at operation 242 to the IA service 104. In some cases, a peer may only be removed from a route either by sending an ignore me message, or when the IA service receives an instruction to ignore a peer, such as peer 120, form m a fleet management service, such as service 134, or from another authorized entity. In this example, membership in a route may be more readily controlled.

To effectively track certificate usage, it may not be enough for IA service 104 to just track individual certificates issued to an IAM entity because the IAM entity is shared by a potentially large number of peers. IA service 104 does not need to distinguish between individual peers to authorize their access, their access is determined by the IAM entity they are allowed to use. However, when IA service 104 issues a certificate it needs to know which specific peer it went to so that it can track how the certificate is being used. And when a new peer comes for a certificate, it needs to know it's a different "unit" so that it can start tracking it. To that end, IA service 104 may track certificate lineages, where every peer 118, 120 has one lineage under normal circumstances. A lineage starts with the first certificate issued to a given peer and ends with the peer itself or a fleet management service, such as service 134, instructing IA service 104 to ignore the peer from now on.

A certificate lineage may be identified by a lineage ID, such as a unique 256-bit number assigned by IA service 104. The IssuePeerCertificate API call may accept lineage ID as an optional parameter. When a new peer calls IssuePeerCertificate without lineage ID, IA service 104 may assign a new lineage ID, embedding it in the issued peer certificate, and returning it along with the certificate back to the peer (to spare the peer from parsing the certificate). When the same peer goes to get a new certificate in the future, it includes the lineage ID and signs the IssuePeerCertificate request with a peer certificate from the same lineage it is asking for.

The ReportCertificateUsage API call and IgnoreMe API call are signed with a peer certificate from the same lineage as the usage report or ignore request. This way, different peers cannot report status of another or tell IA service 104 to ignore others because they cannot obtain private key of a certificate from the requisite lineage to sign the request. An adversary with credentials to access a route can get a new peer certificate and use the route but their peer certificate will have its own new lineage and the adversary can report status only for that lineage. Similarly, the adversary can only tell IA service 104 to ignore its own status when considering whether to rotate RKPs or not. A subset of the report certificate usage, ReportPeerCertificateDeprecated, may be signed by the exact same certificate that is being deprecated.

In some implementations, to help fleet management systems and operators identify which lineage belongs to a given physical host (for example), IA service 104 allows peers to specify self-selected peer nickname and group name. These two attributes exist solely so that fleet management systems or operators can easily see which lineages belong to which "physical" peers (e.g., hostname) rather than opaque identifiers chosen by IA service 104. In some cases, neither attribute is part of certificates issued by IA service 104 because IA service 104 cannot verify their authenticity. Given that fleet management systems primarily identify peers by their self-selected nicknames (e.g., hostnames), there is potential for confusion. If a peer is wiped but keeps its peer nickname (e.g., due to repurpose-in-place), a new lineage will be created and the peer will have two. In some cases, IA service 104 will stop receiving usage reports for the old lineage and will block rotation on it. But a repurposed host is a fleet management event the fleet management service 134 should know about. Since fleet management service 134 knows the host got repurposed in place, fleet management service 134 knows which lineage should be healthy and which one should be ignored and can indicate such to the IA service 104.

In some cases, it is useful for IA service 104 and fleet management service 134 to monitor for concurrent lineages and alarm on them. Concurrent lineages are those where IA service 104 sees a usage report or certificate issuance from lineage A, then from lineage B, and then again from lineage A (all with the same peer nickname and group name). For example, this would happen if the fleet had two hosts that think they have the same hostname. It's possible for an attacker with credentials with permission to IssuePeerCertificate to create a new certificate lineage for another peer. But unless the attacker manages to isolate or kill the original peer, the attacker has two bad options: they can either report status and trigger concurrent lineage alarm because the original peer kept reporting status and getting certs from its lineage. Or the attacker doesn't report anything and invites scrutiny because their lineage blocked rotation. If an attacker chooses an unused peer nickname, fleet management service 134 may not be able to find it in its infrastructure database and which should also trigger an alarm ("unknown peer X in fleet on route Y").

In some cases, each peer 118, 120 the IA service 104 is tracking is either active or ignored and every peer certificate IA service 104 issued is either active or deprecated. Newly issued peer certificates are immediately considered active. The peer that got the new peer certificate is now also considered active regardless of its previous state, if any. As long as an RKP has any associated active peer certificates, the RKP cannot be removed from the route trust store (deactivated). If we allowed the RKP to be deactivated, the peer certificates issued by the RKP would stop being trusted.

A few examples of the different API calls referenced above will be described in more detail below, which may be used in some embodiments. A peer 118, 120 uses IssuePeerCertificate to get its own certificate and ListRouteCertificates to get the list of CA certificates it should trust on a route. GetRouteState, such as used at operation 226, may be used by peers to see if they need to get a new peer certificate or update their route certificates. In some implementations, all three of these operations are needed for adding new peers 118, 120 to a fleet, such that the IA service 104 is designed to maximize the likelihood that it can service these requests even when its dependencies are unavailable.

IssuePeerCertificate, such as may be called at operations 208, 210, may include as inputs: a unique identifier of the route the peer is associated with, such as the route identifier or RN; a certification request including any lineage information (as will be described in greater detail below), a peer public key, and a signature using the peer private key; and a peer nickname and group name. The output of the call may include the peer certificate and an indication of lineage of the peer ID, if available. In some cases, where different peers are assigned server/client roles in a given route, the certificates issued may have one or more restrictions, such as that clients can act as initiators of commination sessions, whereas servers can act as the responder.

GetRouteState, such as may be called at operations 226, may include as an input the route identifier or RN. The output may include a route certificates checksum, which may include the trusted (pending, issuing, and deprecated) route certificates of the specified route. In some cases, the checksum may change when a new pending route certificate is added or a deprecated route certificate is deactivated (removed from the route trust store) but not when the issuing RKP changes. The output may also include an issuing route certificate serial number, which may be used to signal to peers they should ask IA service 104 for a new peer certificate. When a peer 118, 12 notices the issuing certificate SN has changed, it must call IssuePeerCertificate at a random point within the rotation period to get a new peer certificate from the new issuing RKP. This is to prevent "thundering herd" that would occur if the whole fleet noticed all at once the state has changed.

ListRouteCertificate such as may also be called at operations 226, provides peers 118, 120 with route certificates they need to include in the trust store they use when they validate incoming certificates for the given route. GetRouteState is used to signal to peers when they should update their route certificate list and active peer certificates. ListRouteCertificate may have as inputs the route identifier or RN. It may output a page of route certificates (pending, issuing, and deprecated) belonging to the specified route.

In some aspects, some or all or peers such as peers 118, 120, on a route may get updated route information from other peers 118, 120. In this example, one or some peers, which are designated or have a communication link with the IA service 104, in a route may perform operations 226 and 228 to request and obtain updated route information, including any new RKPs or certificates or states thereof that have been added to the trust store. Other peers, which do not have reliable or available communication links with the IA service 104, may then request and get updated route information from those other peers. In yet some examples, a subset of the peers in the route may get route state updates from the IA service 104, and through a mesh network implementation, other peers in the route may obtain the updated route information from those peers. In some aspects, a central updating scheme may be combined with a mesh network implementation for route information updates, such as need arises (e.g., based on available/reliable communication links between peers 118, 120 and IA service 104), to maintain flexibility, to reduce network bandwidth consumption, and for other design reasons.

Figure 3:
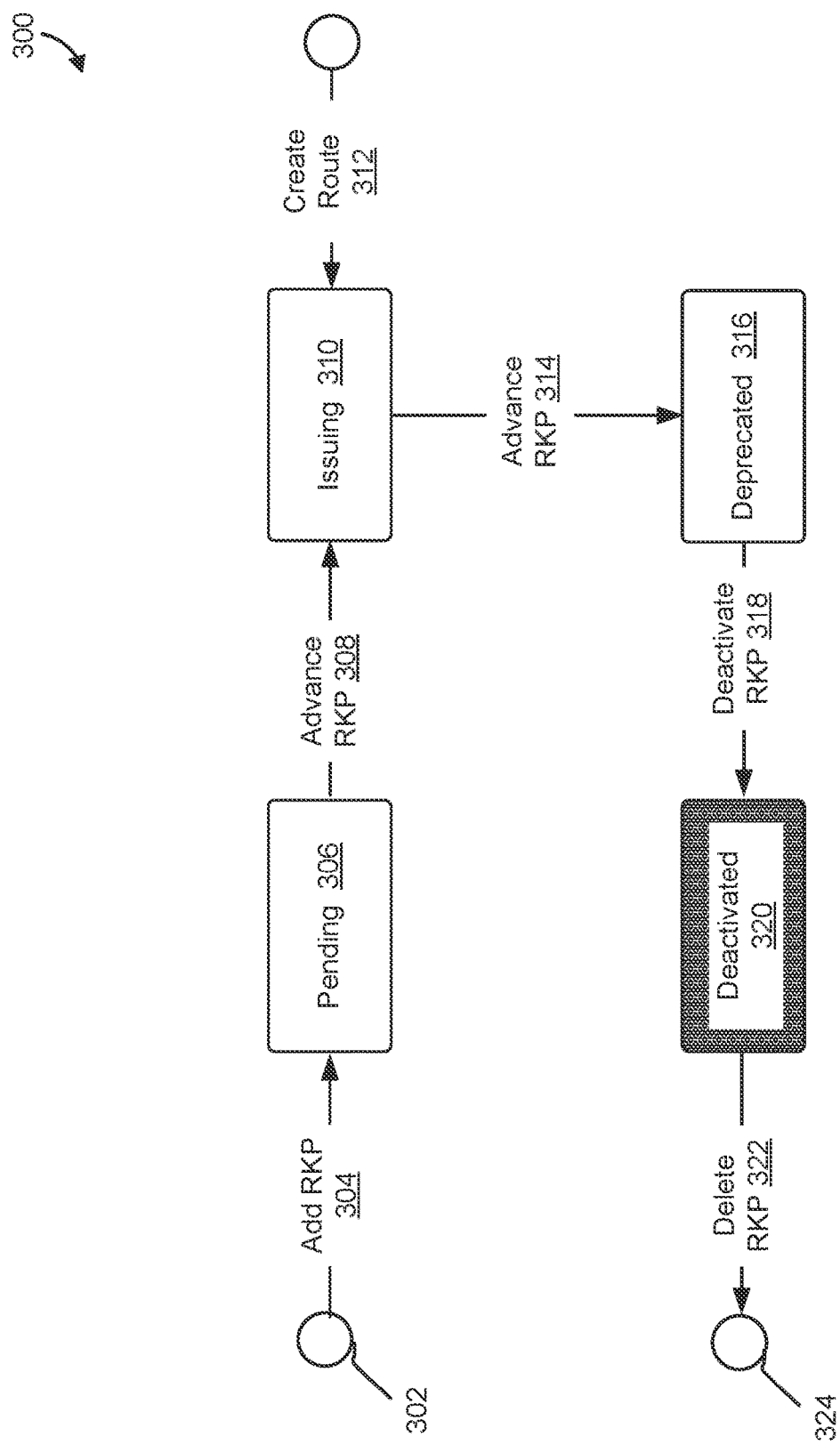
FIG. 3 illustrates an example process for updating an individual key of a trust store, according to at least one embodiment.

FIG. 3 illustrates an example process 300 for updating an individual key of a trust store, according to at least one embodiment. Process 300 may be performed by the IA service 104 in coordination with the data storage service 106 and KMS 112, described above. Process 300 may illustrate a lifecycle of a given route key pair (RKP)/certificate as it is rotated through different states or statuses. As illustrated, an RKP is trusted in the pending 306, issuing 310 and deprecated 316 states, and is only not trusted in the deactivated states 320. This is primarily to prevent communication breakdown between peers, as will be described in greater detail below.

Process may begin at point 302, where an RKP may be added to the trust store for a route, at operation 304. Operation 304 may be performed by the IA service 104 via requesting a key pair from KMS 112. Once added, the RKP will be associated with a pending status 306. Pending RKPs are trusted but aren't yet used for issuing new certificates.

Upon the existence of a triggering event, the RKP will be advanced, at operation 308 by the IA service 104 to issuing status 310. The triggering event may include the passage of a configurable time period, such as 1 day or 24 hours. In other cases, the time period may be determined based on various needs and security concerns with peers on a given route, including how many peers are in the group, what type of data the route is communicating, overhead in terms of resource usage, cost, and so on. Issuing RKPs are trusted and they are used to issue new certificates. In some implementations, a route has exactly one issuing RKP at any given point in time. In other aspects, the triggering event may include detecting the occurrence of an emergency event. The emergency event may include detecting a breach or potential breach of security with one or more of the peers or IA service, a loss of trust in one or more of the peers, a lack of communication or expected communications from one or more of the peers, or other event that may indicate trust has been compromised within the route in some way. In yet other aspects, the triggering event may include some other event that prompts an action to rotate the RKPs. In some cases, once an RKP is set to issuing, it may be used to create a route, at operation 312, in the first instance.

Next, the RKP may be advanced, at operation 314, such as by the IA service 104, to a deprecated status 316. Deprecated RKPs are trusted but they are no longer used to issue new certificates. However, it the case that a new issuing certificate fails or is not received by any peer in the route, a deprecated RKP may still be used to issue certificates, and because a deprecated RKP was already trusted by peers in the route, it can still be used to securely communicate with other peers in the route. At operation 318, a deprecated RKP may be advanced to a deactivated state 320. Deactivated RKPs are no longer trusted but they are maintained so that they can be revive them in case their deactivation caused operational impact, such as preventing one or more peers from communicating with other peers in the route. An RKP may be moved to a deactivated state upon verification from some or all (e.g. a threshold number or percentage) of peers in a route that the RKP is no longer being used to issue certificates. This is to ensure that a RKP that is currently being used by one or more peers in the group is not deactivated, thus preventing that peer from communicating with the rest of the route.

Upon the detection of a triggering event, such as an instruction from a fleet management service 134, a RKP may be deleted at operation 322, upon which the lifecycle of an RKP ends at point 324. In some implementations, the IA service 104 does not change the state of an RKP without being asked to by an external system. Every route inevitably has unresponsive peers and decision needs to be made whether to block rotation or not. In some cases, a fleet management service 134 may be responsible for making a decision whether to ignore a peer or not. In practice, a fleet management service 134 may actually be a collection of systems that manage different groups of peers on the route (e.g., one for the servers and one for each client fleet).

In some aspects, new RKPs may be added to a trust store at a time interval. When a new RKP is added to the trust store, each RKP in the trust store may be rotated to the next status or state, such that operations 304, 308, 314, 318, and in some cases, operation 322 may be performed contemporaneously or in a coordinated way. For example, the rotation period may be set at 24 hours. The minimum age of the oldest pending RKP to start issuing: may be set to four times the rotation period, or four days. Similarly, the minimum deprecation duration of RKP at removal may also be set to four times the rotation period, or four days. The minimum age of a deactivated RKP at deletion may be set to fourteen times the rotation period, or fourteen days. In some cases, the number (e.g., maximum) number of pending RKPs may be set at seven times the rotation period or seven days. The number of pending RKPs may be set to seven so that a route has a week's worth of pending key pairs and moves to the next one every day. An advantage of having multiple RKPs created in advance is that the process can be exercised every day and peers can know seven days in advance what the route certificate is going to be seven days from now. This enables amply time for peers, such as a large number of peers, to synchronize. In some cases, the minimum number of deprecated RKPs may be set to six times the rotation period, or six days. It should be appreciated that the time periods and relationship between time periods described above are only given by way of example, and that other time periods and relationships between time periods are contemplated herein.

Figure 4:
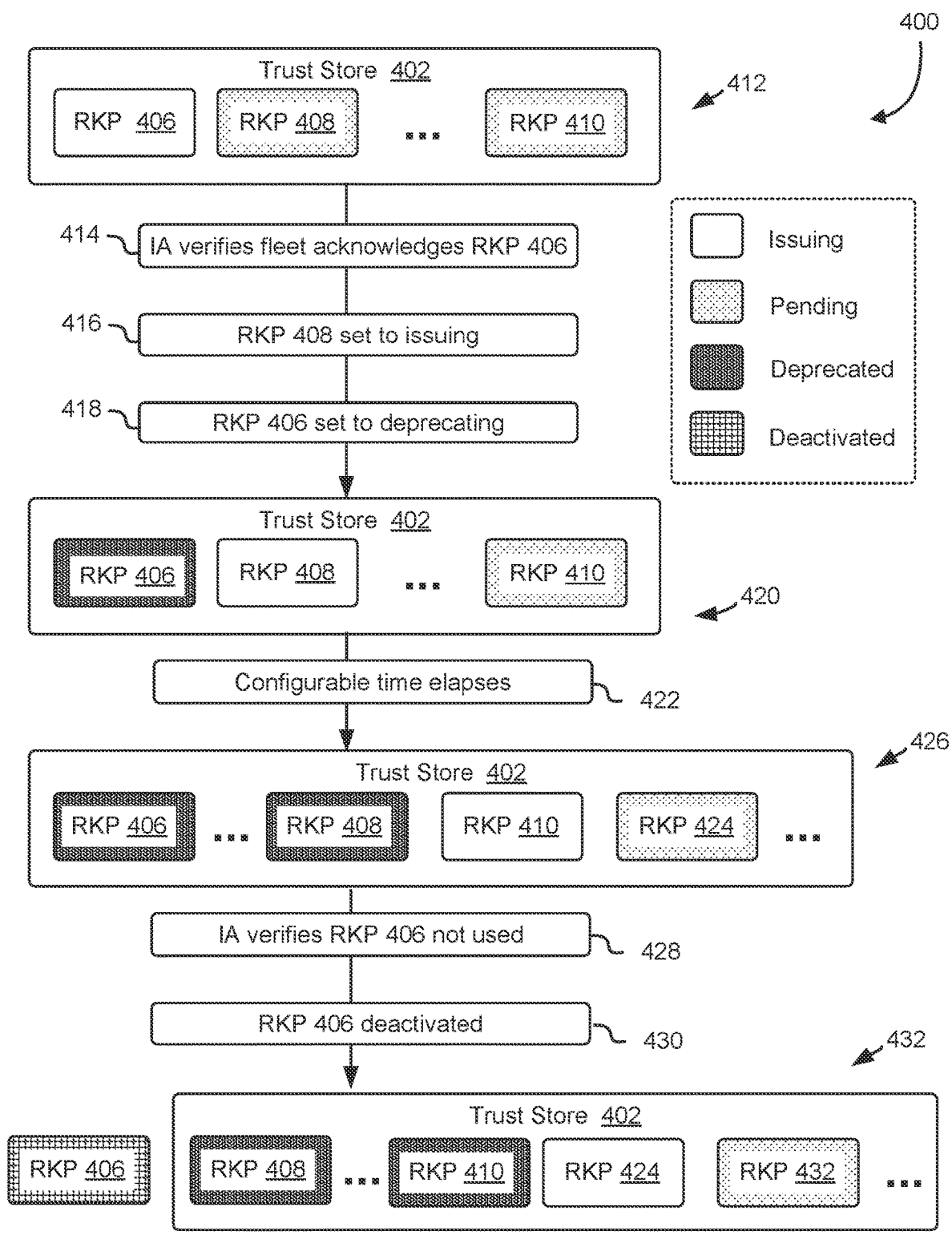
FIG. 4 illustrates an example process for rotating keys in a trust store, according to at least one embodiment.

FIG. 4 illustrates an example process 400 for rotating keys in a trust store 402, according to at least one embodiment. In some cases, process 400 may be performed by the IA service 104, in coordination with the data storage service 104, KMS 112, and/or fleet management service 134 described above. In some embodiments, each peer, such as peer 118, 120, 122, may maintain some or all of the information of trust store 402, and update the trust store in a coordinated way with the IA service 104. In some cases, peers 118, 120, 122 may update the trust store 402 somewhat behind in time from the IA service 104, such as to account for communication delay. In some cases, as described above in reference to FIG. 2, each peer may periodically check in with the IA service 104 to determine the current state of the trust store 402 and update its own version of the trust store accordingly. In some aspects, individual key rotation may follow process 300 described above, such that new keys are added and states of keys are rotated within trust store 402 at determined intervals.

In the example illustrated, trust store 402, in a first state 412, may include a number of RKPs 306, 308, through 310, with RKP 406 set to issuing and RKPs 408 through 410 set to pending. Trust store 402 may be configured to hold any number of RKPs at a given time. State 412 of trust store 402 may represent a time at a certain number of rotations, such as early on in the establishment of the route, where no RKPs have been moved to deprecated state.

At the expiration of a time interval, such as 24 hours, or upon a request or other triggering event, the IA service 104 may verify that the fleet/peers in the route acknowledges that RKP 406 is going to be rotated or its status changed, at operation 414. This may include receiving messages or check-ins from the peer in the route indicating the current status of the RKPs that they currently are using/are in their trust stores. Next, the IA service 104 may set pending RKP 408 to issuing status, such that RKP can, in some cases immediately, be used to issue certificates used by peers in the route. The IA service 104 may also set the last or oldest pending RPK (e.g., that has been in pending status for the longest duration or number of rotation periods) to deprecated state, at operation 418.

Operations 414, 416, and 418 may result in a new state 420 of trust store 402 including RKP 406 in the deprecated state, RKP 408 in the issuing state, and RKP 410 in the pending state. After the passage of a configurable duration of time (e.g., 24 hours in the examples described above), a similar set of operations as operations 4141, 416, and 418 may be performed to result in a new state 426 of trust store 402, which includes RKP 406 and RKP 408 in a deprecated state, RKP 410 in an issuing state, and RKP 424, which may be a newly added RKP, in a pending state.

At the expiration of the next rotation period, for example, the IA service 104 may verify the RKP 406 is not used by the peers of the route, at operation 428. In some cases, this may include determining that a threshold number of the peers in the route are not using RKP 406. In some cases, the threshold may be all of the peers, such as to ensure that no peer is stuck using a deactivated certification, which would prevent that peer from communicating with other peers in the route. This cycle may continue multiple times until some type of expiration event occurs or the route is no longer needed, etc. Upon verifying that the threshold number of peers is not using RKP 406, the IA service 430 may deactivate RKP 406 at operation 430. Operation 430 may result in a new state 432 of trust store 402, which includes RKP 408 and RKP 410 in the deprecated state, RKP 424 in the issuing state, and RKP 432 in the pending state. RKP 406 may be deactivated and removed from the trust store 402. In some cases, RKP 406 may be maintained by the IA service 104, and/or one or more of the peers in the route, in the event that the RKP 406 needs to be reactivated, such as to allow a peer that has not updated its trust store, to communicate with other peers.

Figure 5:
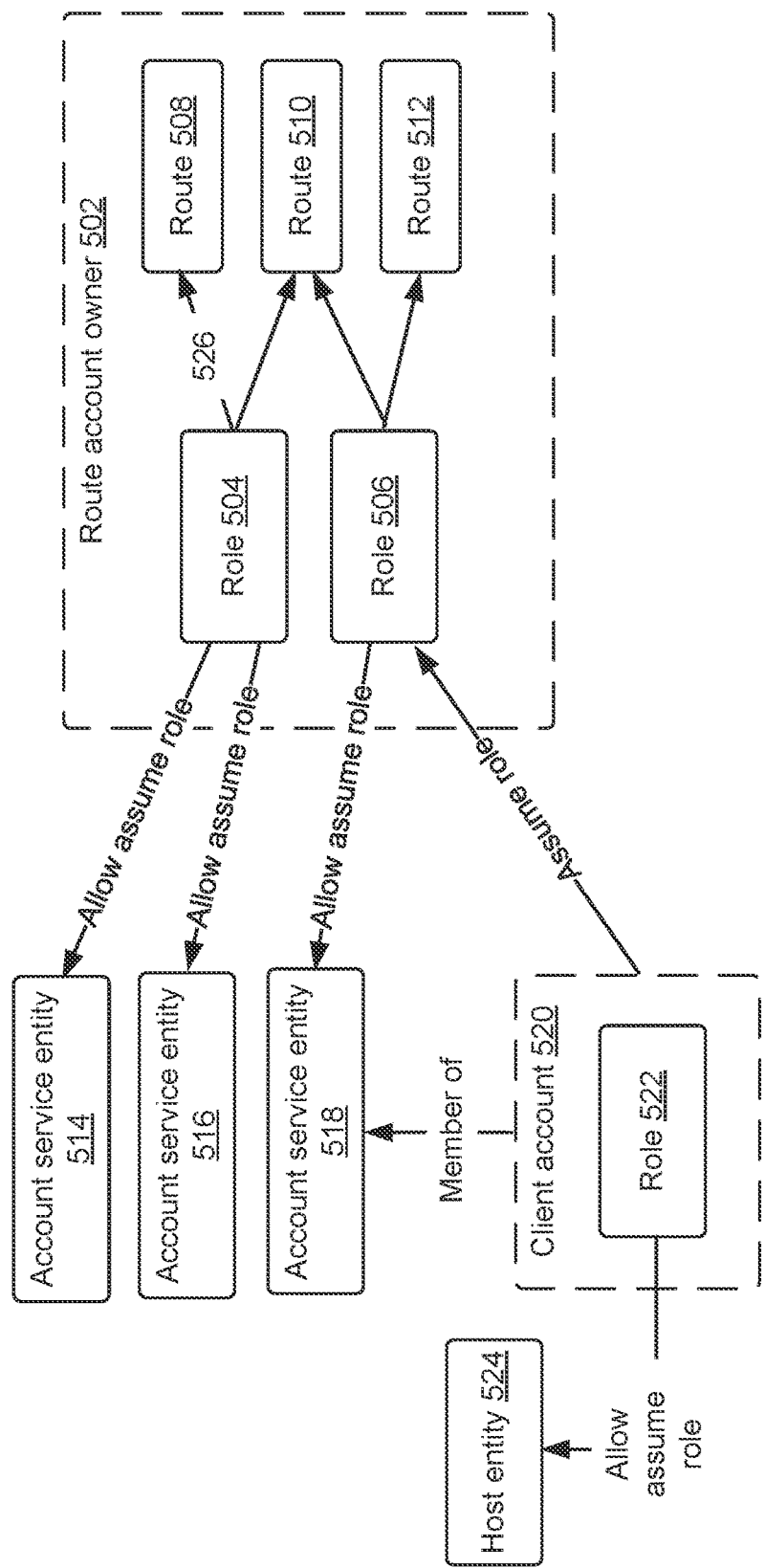
FIG. 5 illustrates an diagram of ownership roles for a route, according to at least one embodiment.

FIG. 5 illustrates a diagram 500 of ownership roles for a route, according to at least one embodiment. In some aspects, the various roles described below in reference to diagram 500 may be managed by an IAM service, such as IAM service 134 described above in reference to FIG. 1.

In some cases, a route may be established, controlled, and managed by an IAM account, or other existing account management infrastructure, such as provided by an IAM service 114 of a computing resource service provider 102. In examples where peer devices of a route are split into client-server roles, a service team or entity controlling the server would control the route because it controls access to the server. The owning account controls access to the route by controlling the permission policies of the IAM entities (users, groups, roles) within the owning account. The account that manages a route is referred to as a route account owner 502. A route account owner may own multiple routes 508, 510, 512, and may configure and control different roles 504, 506 that permit different levels of access to routes 508, 510, 512.

One way to access a route from a different account is through roles 504, 506 established through IAM service 114. The IAM entity in the client account assumes a route access role in the account that owns the route, and uses the assumed role to talk to IA service 104. Beyond that, route owners can organize authentication and authorization in any way they want. IA service 104 typically simply verifies whether an IAM identity is allowed to perform the requested operation on a route and requires that both be in the same account.

One way to identify IAM accounts that are allowed to assume the route access role is through internal service principals. The route owner 502 creates the route access role 504, 506 in their account. The role's permissions policy (what the role can do) allows accessing a route. In the example illustrated, role 504 can access 526 routes 508 and 510, while role 506 can access routes 510, 512. The role's assume role policy (what entity can assume the role) allows the different account service entities 514, 516, 18 to assume the role. This role (and its siblings, one route can have multiple roles) is responsible for controlling access to the route. Client devices/accounts 520 have freedom to organize permissions in their accounts. The route owner 502 just needs to know the account service entity to allow an entity to access a route. In this scenario, there is no need to manage lists of account IDs, IAM entity IDs, role names, and so on.

Client accounts 520 will typically use some kind of identity/infrastructure role 522 on their end to control access to routes their account has been given access to through its account service entity 518. The infrastructure role 522 may integrate with a short-term credential management system to automatically allow the right hosts or humans to assume the role.

Figure 6:
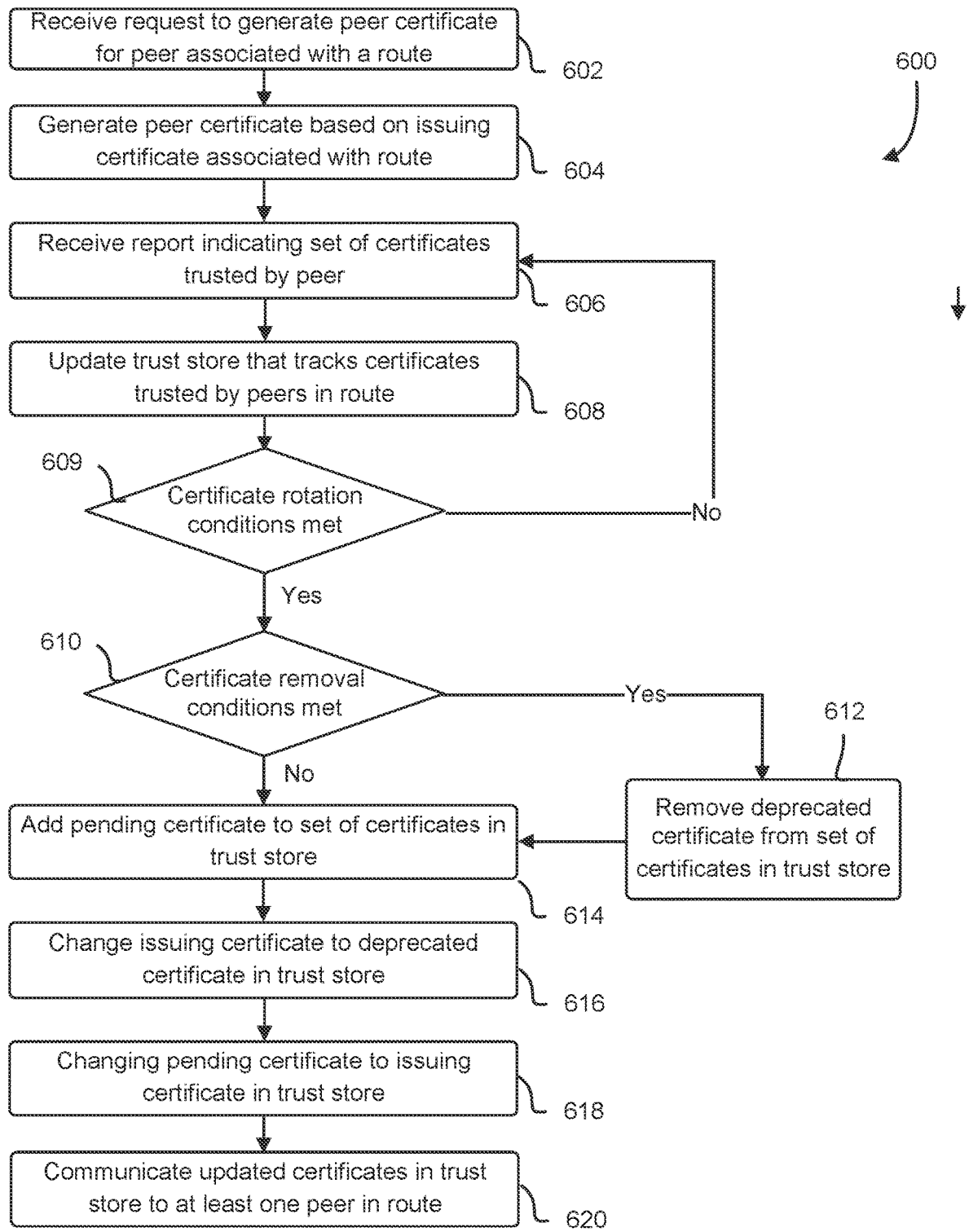
FIG. 6 illustrates an example process for establishing a secure route between peer devices, according to at least one embodiment.

FIG. 6 illustrates an example process 600 for managing a trust store to enable peer devices of a route to securely communicate with one another. Process 600 may be performed by one or more of the IA service 104, the data storage service 106, the KMS 112, the fleet management system, 134, and/or the IAM service 114 of computing resource provided 102, as described in greater detail above. Process 600 may utilize communication schema 200 described above in reference to FIG. 2 and/or the rotating RKP/certificates structure or process as described above in reference to FIGS. 3 and 4. Process 600 may additionally or alternatively implement a role structure, such as role structure 500 described above in reference to FIG. 5.

Process 600 begins at operation 602, in which an IA service, such as service 104, receives a request to generate a peer certificate from a peer associated with or part of a route, such as a peer 118, 120, 122 or route 116. Operation 602, and the request itself, may include one or more aspects of the IssuePeerCertificate API described above in reference to FIG. 2. The IA service 104 may, in response to the request, generate a peer certificate based on the issuing certificate associated with the route, at operation 604. Generating the peer certificate may be based on a RKP that is stored in the trust store and/or accessed via the KMS 112. As described in reference to FIG. 6, reference to a certificate that is issued using an underlying RKP, may be used as shot hand to additionally or alternatively refer to the underlying RKP as well.

The IA service 104 may receive a report indicating a set of certificates trusted by different peers in the route, at operation 606. As described above, peers may periodically report the status of their trust store to the IA service 104, such as every hour, to synchronize trust scores across a route. Operation 606 may include obtaining, such as by IA service 104, first data from a peer computing system that indicates a set of certificates trusted by the peer computing system.

The IA service 104 may update the trust store that tracks certificates trusted by peers in the route, at operation 608, as described above. Operation 608 may include updating, by the IA service 104, based on the first data, second data that tracks certificates trusted by a plurality of peer computing systems that includes the peer computing system.

The IA service 104, at operation 609, may determine if one or more certificate rotation conditions are met (e.g., a set of conditions). The one or more conditions may include the passage of a rotation period that triggers actively rotating keys, a specific request to rotate keys, or other events that may make it beneficial to rotate the certificates used by peers in the route. In some cases, operation 609 may include the IA service 104 generating a determination that a set of peers that individually trust at least one public key from a plurality of public keys satisfies a set of conditions, such as based on the reports received at operation 606.

A certificate may be removed if, and in some cases, only if, certain conditions are met for the removal, at operations 610 and 612. In some examples, a certificate may be removed upon receipt of an instruction to remove the certificate from an authorized entity, such as a fleet management system 134. If the condition or conditions are met, at operation 610, then the certificate may be removed from the trust store maintained by the IA service, at operation 612. If the condition are not met, or following performance of operation 612, a pending certificate may then be added to the trust store, at operation 614.

The certificate previously indicated as issuing may be changed to deprecated status, at operation 616, and a pending certificate (e.g., the oldest pending certificate) may be changed to issuing status, at operation 618. Issuing status may include a status that allows the certificate to be used by the peers in the route for peer-to-peer communication (e.g., to be used to sign/encrypt messages and decrypt messages). The updated trust store, including the certificates and their corresponding status, may then be communicated to at least one of the peers in the route, at operation 620. As described above, operations 606, 608, 609, 610, 612, 614, 616, and 618 may include one or more aspects of process 300 and 400 described above, such as rotating the RKP/certificate between pending, issuing, deprecated, and deactivated states.

Figure 7:
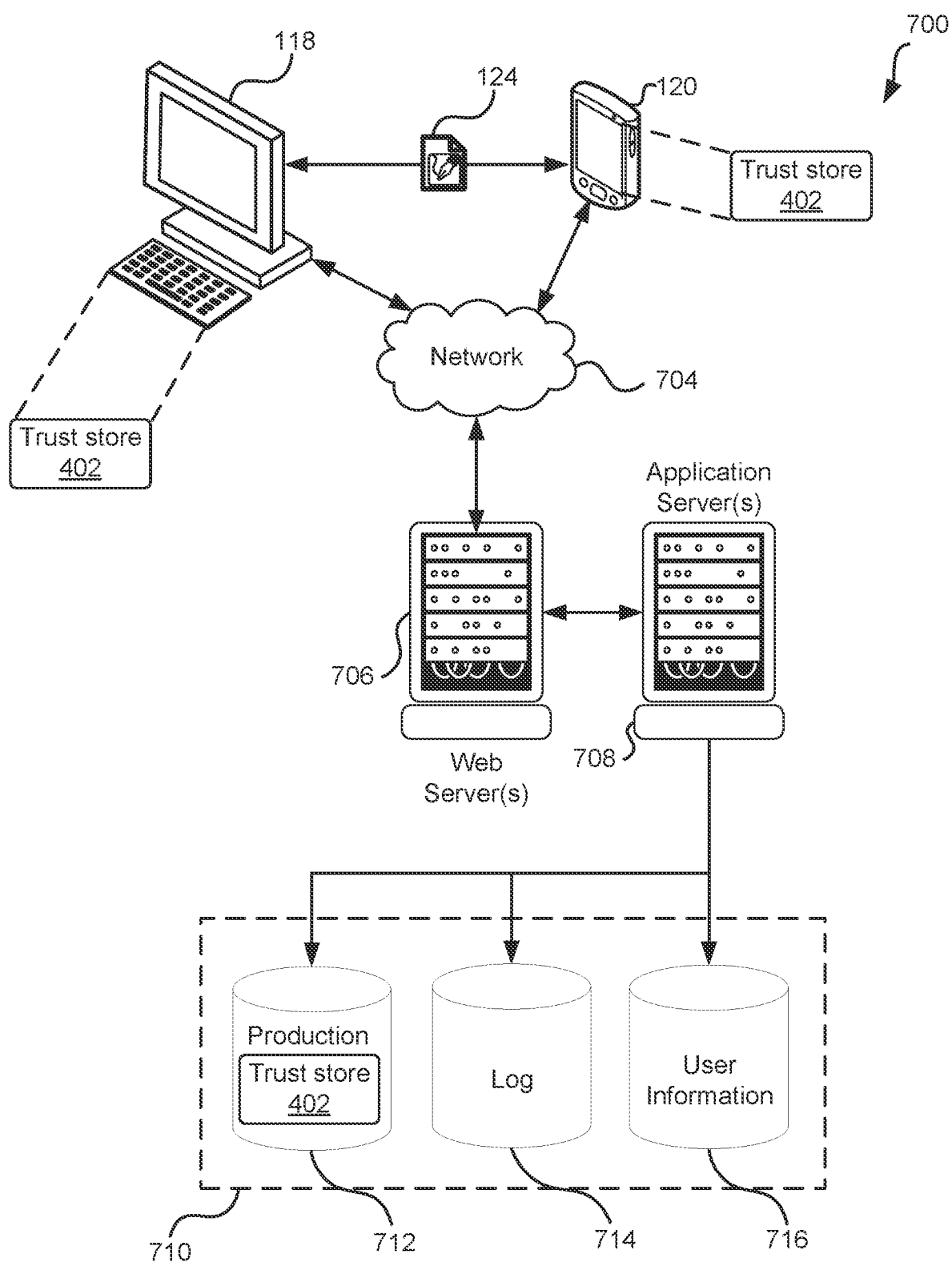
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes one or more client or peer devices 118, 120, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

As illustrated, each client or peer device 118, 120 may maintain a trust store 402, such as is managed by one or more application servers 708. The trust store may store various RKPs/certificates, such as certificate 124, which peers 118, 120 may use to securely communicate with one another, via the techniques described above.

In an embodiment, the illustrative system includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 118, 120. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure. In some examples, the data store may store and maintain a trust store 402, such as by rotating keys through the trust store to enable peer devices 118, 120 to securely communicate with one another, via the techniques described above.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors-for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer implemented method, comprising:
    obtaining first data from a peer computing system that indicates a set of certificates trusted by the peer computing system;
    updating, based on the first data, second data that tracks certificates trusted by a plurality of peer computing systems that includes the peer computing system;
    generating, based on the second data, a determination that a set of conditions for updating a plurality of certificates is satisfied, wherein the set of conditions comprise an indication that at least a threshold number of peer computing systems have stopped using a second certificate to authenticate communications with other peer computing systems of the plurality of peer computing systems, wherein individual certificates of the set of certificates are configured independently of other certificates of the set of certificates to establish trust by or with the peer computing system;
    as a result of the determination, updating the plurality of certificates to result in an updated plurality of certificates by:
        adding a first certificate to the plurality of certificates;
        removing the second certificate from the plurality of certificates; and
        changing a status of at least one third certificate to allow the at least one third certificate to be used by the plurality of the peer computing systems to verify peer certificates that are used to authenticate for peer-to-peer communication; and
    communicating to at least one of the plurality of peer computing systems third data that indicates certificates in the updated plurality of certificates.

2. The method of claim 1, wherein the set of conditions for updating the plurality of certificates are independent of an issuing time and expiration time of individual certificates of the plurality of certificates.

3. The method of claim 1, further comprising:
    changing a status of a fourth certificate of the plurality of certificates, to deprecated, wherein the first certificate, the third certificate, and the fourth certificate are operable by the plurality of peers to form at least one secure communication channel between individual peers of the plurality of peers.

4. The method of claim 1, wherein adding the first certificate to the plurality of certificates comprises providing the first certificate with a status that causes the first certificate to be prevented from being used to issue certificate but that allows the status to be changed to allow the first certificate to issue other certificates.

5. A system, comprising:
at least one processor;
memory that stores computer-executable instructions that, as a result of being executed by the one or more processors, cause the system to:
generate a determination that a set of conditions for updating a plurality of certificates is satisfied, wherein the set of conditions comprise an indication that at least a threshold number of peer computing systems of a plurality of peer computing systems have stopped using a second certificate to authenticate communications with other peer computing systems of the plurality of peer computing systems, wherein individual certificates of the set of certificates are configured independently of other certificates of the set of certificates to establish trust by or with the peer computing system;
as a result of the determination update the plurality of certificates to result in an updated plurality of certificates by:
adding a first certificate to the plurality of certificates;
removing the second certificate from the plurality of certificates; and
changing a status of at least one third certificate to allow the at least one third certificate to be used by the plurality of the peer computing systems to verify peer certificates that are used to authenticate for peer-to-peer communication; and
communicating to at least one of the plurality of peer computing systems third data that indicates certificates in the updated plurality of certificates.

6. The system of claim 5, wherein the computer-executable instructions that cause the system to generate the determination that the set of conditions for updating a plurality of certificates is satisfied further include instructions that further cause the system to:
determining that an emergency event has occurred.

7. The system of claim 6, wherein the determination that at least a threshold number of peers computing systems of the plurality of peer computing systems have stopped using the second certificate to authenticate communications with the other peer computing systems of the plurality of peer computing systems is based on an indication, obtained from at least a subset of the plurality of peer computing systems, of what certificates are used by at least the subset of the plurality of peer computing systems.

8. The system of claim 6, wherein the threshold number of individual peers comprises a total number of the plurality of peers.

9. The system of claim 5, wherein the computer-executable instructions further comprises instructions that, as a result of being executed by the one or more processors, further cause the system to:
responsive to obtaining a request from an individual peer computing system of the plurality of peer computing system to update the updated plurality of certificates that are to be trusted, send an indication of a modified plurality of certificates to the individual peer computing system.

10. The system of claim 5, wherein the computer-executable instructions further comprises instructions that, as a result of being executed by the one or more processors, further cause the system to:
obtain a request to deactivate a first certificate of the plurality of certificates from an authorized source;
responsive to obtaining the request to deactivate the first certificate of the plurality of certificates from the authorized source, change a status of the first certificate from an inactive state to a deactivated state.

11. A non-transitory computer-readable storage medium storing thereon executable instructions that, as a result of being executed by one or more processors of a computer system, cause the computer system to at least:
determine that a set of conditions for updating a plurality of certificates is satisfied, wherein the set of conditions comprise an indication that at least a threshold number of peer computing systems have stopped using a second certificate to authenticate communications with other peer computing systems of the plurality of peer computing systems, wherein individual certificates of the set of certificates are configured independently of other certificates of the set of certificates to establish trust by or with the peer computing system;
as a result of the determination,
update the plurality of public of certificates to result in an updated plurality of certificates by:
adding a first certificate to the plurality of certificates;
removing the second certificate from the plurality of certificates; and
changing a status of at least one third certificate to allow the at least one third certificate to be used by the plurality of the peer computing systems to verify peer certificates that are used to authenticate for peer-to-peer communication; and
communicating to at least one of the plurality of peer computing systems third data that indicates certificates in the updated plurality of certificates.

12. The non-transitory computer-readable storage medium of claim 11, wherein individual certificates of the plurality of certificates are generated using at leas tone public key.

13. The non-transitory computer-readable storage medium of claim 11, wherein the instructions further comprise instructions that, as a result of being executed by the one or more processors, cause the computer system to:
periodically update the plurality of certificates by at least adding at least one certificate to the plurality of certificates.

14. The non-transitory computer-readable storage medium of claim 11, wherein the instructions further comprise instructions that, as a result of being executed by the one or more processors, cause the computer system to:
periodically update the plurality of certificates by at least changing the status of at least one certificate of the plurality of certificates to deprecated, wherein the at least one certificate with a status of deprecated is trusted by the set of peer computing devices but is prevented from generating new certificates.

15. The non-transitory computer-readable storage medium of claim 11, wherein the instructions further comprise instructions that, as a result of being executed by the one or more processors, cause the computer system to:
responsive to determining that a certificate corresponding to a public key of a plurality of public keys has not been used by at least one peer computing device of the plurality of peer computing devices for a time period, trigger a notification to be sent without removing the public key from an updated plurality of public keys.

16. The non-transitory computer-readable storage medium of claim 11, wherein determining that the threshold number of the set of peer computing devices no longer uses the first key to generate certificate is based on obtaining an indication, from at least a subset of peer computing devices of the set of peer computing devices, indicating which of the plurality of certificates in use by at least the subset of peer computing devices.

17. The non-transitory computer-readable storage medium of claim 11, wherein the computer-executable instructions further comprises instructions that, as a result of being executed by the one or more processors, further cause the system to:
responsive to obtaining a request to deactivate the first certificate of the plurality of certificates, deactivate the first certificate, wherein upon deactivating the first certificate, the plurality of certificates comprises at least one second certificate with a status of pending, at least one third certificate with a status of issuing, and at least one fourth certificate with a status of deprecated.

* * * * *